United States Patent [19]

Conn, Jr.

[11] 3,866,305

[45] Feb. 18, 1975

[54] INTERNALLY STIFFENED CONTOURED SHELL STRUCTURE AND METHOD FOR FABRICATING SAME

[75] Inventor: Charles E. Conn, Jr., Santa Ana, Calif.

[73] Assignee: Tool Research & Engineering Corporation, Beverly Hills, Calif.

[22] Filed: Aug. 14, 1972

[21] Appl. No.: 280,645

[52] U.S. Cl. ................... 29/471.1, 29/480, 29/494, 29/497.5, 29/498, 29/156.8 H, 416/233
[51] Int. Cl. ........................................... B23k 19/00
[58] Field of Search.. 29/156.8 B, 156.8 H, 156.8 P, 29/429, 497.5, 498, 471.1, 475, 480, 494; 416/229, 232, 233; 156/245, 285, 288

[56] References Cited
UNITED STATES PATENTS

| | | | |
|---|---|---|---|
| 1,635,009 | 7/1927 | Reed | 29/156.8 B |
| 2,700,632 | 1/1955 | Ackerlind | 156/285 |
| 2,828,531 | 4/1958 | Bath | 29/156.8 P |
| 2,866,075 | 12/1958 | Pappelendam | 29/429 |
| 3,056,188 | 10/1962 | Stalker | 29/429 |
| 3,068,565 | 12/1962 | King et al. | 416/229 |
| 3,158,732 | 11/1964 | Kazakov | 29/498 |
| 3,166,295 | 1/1965 | Szewaliski | 29/156.8 B |
| 3,365,787 | 1/1968 | Forsberg et al. | 29/471.1 |
| 3,460,233 | 8/1969 | Pfaffenberger et al. | 29/497.5 |
| 3,628,226 | 12/1971 | Nelson | 29/156.8 H |
| 3,649,425 | 3/1972 | Alexander | 29/156.8 B |
| 3,736,638 | 6/1973 | Stone | 29/156.8 H |

FOREIGN PATENTS OR APPLICATIONS

| | | | |
|---|---|---|---|
| 720,956 | 12/1954 | Great Britain | 416/229 |
| 771,883 | 4/1957 | Great Britain | 29/156.8 H |
| 567,999 | 12/1958 | Canada | 29/498 |

OTHER PUBLICATIONS
Smallen, H. et al., Welding Journal, Corrugated-Sandwich Structure, April, 1960, pp. 314-321.
Rechlin, F. F., Product Engineering, Brazed Honeycomb Sandwich, Sept., 1959, pp. 375-377.

*Primary Examiner*—C. W. Lanham
*Assistant Examiner*—Dan C. Crane

[57] ABSTRACT

The present invention is a light weight, internally stiffened shell structure constructed in the particular shape and with the contours required of structural members in a variety of applications, and a novel method for fabricating the same. The invented structure provides a heretofore unattainable strength to weight ratio and is therefore particularly advantageous in applications such as the rotating blades and stationary vanes in airborne or ground powder conversion equipment. The invented structure is a suitably shaped and contoured honeycomb panel comprising a metallic flanged honeycomb core material interposed between, and joined to, a pair of relatively thin corresponding metallic sheets which form the skin of the shell structure. Typical metals used to construct the structure are the wrought alloys such as titanium, aluminium and stainless steel, nickel base alloys, cobalt base alloys and columbium base alloys, etc. The invention also contemplates the inclusion of tubes through the core materials to increase shear and bending stiffness and the provision of fluid flow passages through the core material when required by the application. The invented method for fabricating the structure broadly involves the steps of fabricating a honeycomb panel blank, crushing, die forming, creep twisting and diffusion bonding.

23 Claims, 19 Drawing Figures

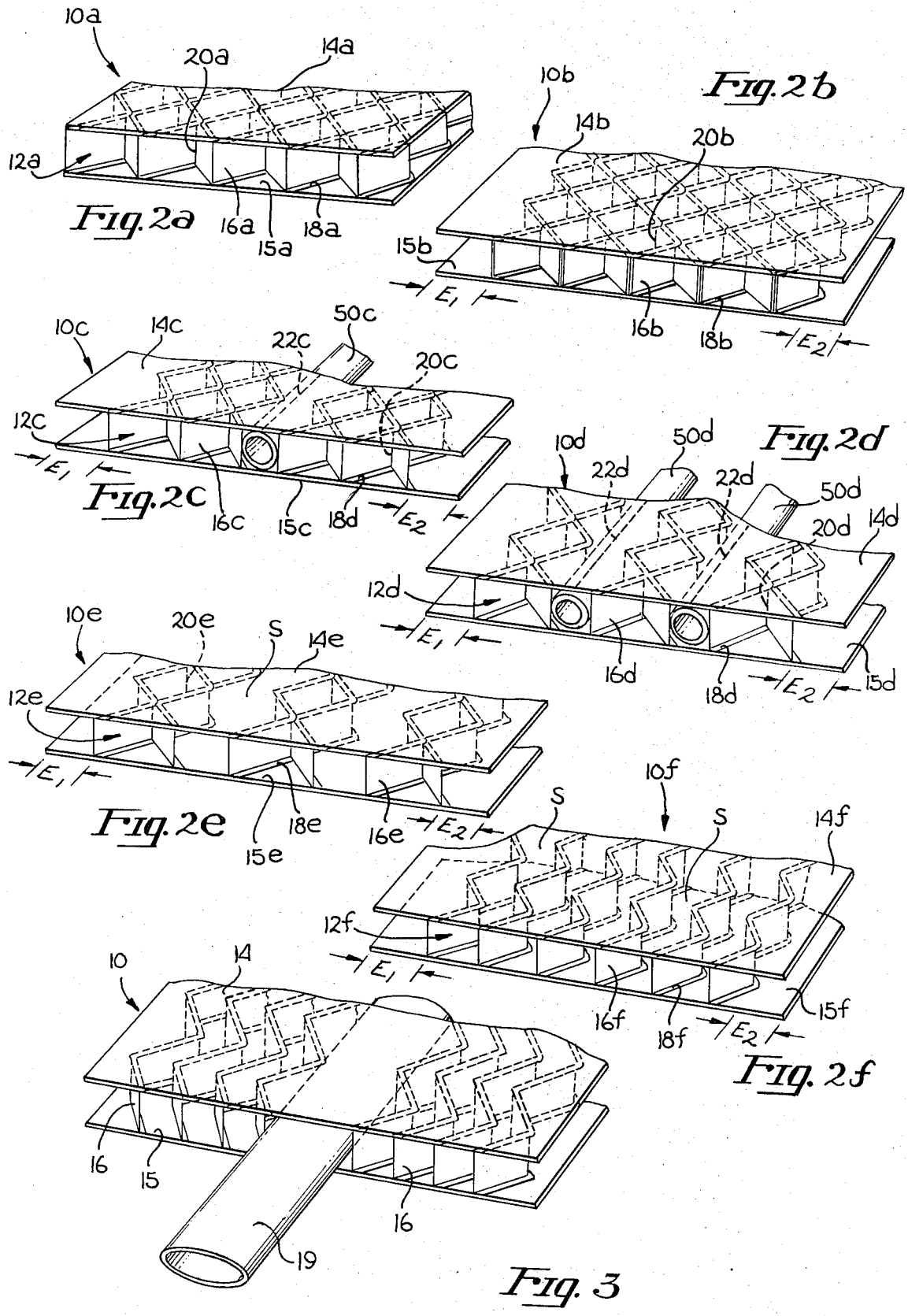

INTERNALLY STIFFENED CONTOURED SHELL STRUCTURE AND METHOD FOR FABRICATING SAME

BACKGROUND OF THE INVENTION

1. Field of the Invention

This invention relates generally to internally stiffened shell structures and, more particularly, to thin skin honeycomb core structures shaped and contoured for particular applications, and a method for fabricating the same.

2. Prior Art

Lightweight, structurally efficient shell structures are highly advantageous when used in applications such as the vanes and blades in power conversion equipment, aircraft struts, helicopter blades, missile wings and fins to name the most common applications. In each of these applications, a high structural strength to weight ratio is critical to system performance. However, while strength to weight efficiency is important and desirable, it must be attainable within the economic constraints of system cost effectiveness.

In order to illustrate the state of the prior art relating to contoured, stiff structural members, the present methods for fabricating turbofan stator vanes and fan blades will be described. The most common method today for fabricating such vanes and blades is by forging solid blanks, followed by 100% machining to achieve the desired shape and contours. While net precision forgings may also be produced, these require use of special alloys known in the art. In the case of larger vanes and those requiring anti-icing passages, built-up brazed assemblies are typically produced. Each of these present methods are relatively costly and produce vanes and blades which are heavier than desirable. Recent "advances" in the art, such as the filling of hollow structures with suitable potting compounds, have enabled the production of lighter vanes and blades. However, the vanes and blades so produced have suffered from a disappointingly high failure rate. A further shortcoming of vanes and blades produced by the methods of the prior art are their susceptibility to catastrophic failure caused by foreign object damage.

The present invention overcomes these shortcomings and limitations of the prior art by disclosing an internally stiffened shell structure having lighter weight, lower cost and greater structural integrity than has heretofore been attainable, and a practical method for its fabrication. The phrase "structural integrity" as used herein relates to the strength and stiffness of the structure per pound and its resistance to catastrophic failure from foreign object damage.

In order to illustrate the substantial weight reduction achieved by this invention, the following comparison is made of the relative weights of three examples of a first stage, titanium alloy stator vane of a typical jet engine, two produced by methods of the prior art and one by the teachings of this invention.

| Method | Weight of Vane (lbs) |
|---|---|
| 1. Forging and Machining | .49 |
| 2. Filling Hollow Blade with Potting Compound | .33 |
| 3. Present Invention | .23 |

It can be seen that the vane produced by the present invention is less than half the weight of the forged (solid) vane and approximately 30% lighter than the hollow-filled vane. In the case of rotating fan blades, the lighter weight attainable by this invention results in additional weight and economic savings in the full engine configuration by virtue of the reduction of the loads on bearings, support structures and containment shrouding. For example, by using fan blades having the invented structure in an engine, an additional weight saving of 4 to 5 times the weight saving of the blades is typically possible in the total engine.

Power conversion equipment which utilizes the change in velocity and direction of gas flow requires the use of rotating blades and stationary vanes. For airborne equipment it is necessary that maximum strength to weight ratio structural concepts be utilized to achieve the required power to weight efficiency. In all cases, it is desirable to minimize the weight of the rotating blades. Blades and vanes are thin aerodynamic shapes with varying degrees of camber, twist, and thickness as a function of the gas flow requirements. The gas pressure and flow characteristics impose bending strength and stiffness, torsional strength and stiffness, and shear strength and stiffness requirements upon the blade and vane structural configuration.

It is known that the lightest weight structures are achieved by utilizing a material having a high strength to weight ratio in conjunction with a structural configuration which places this material at the periphery of the structure, i.e., a hollow section. However, when using a hollow section with thin material, the material becomes unstable in compression and shear buckling modes. The use of honeycomb cellular core material to stabilize the thin facing skins of hollow section has been developed and proved in service for many years. While such honeycomb core structures are known in the prior art, they have been used in substantially planar configuration and heretofore it has not been known how to fabricate them in the intricate shapes and geometric forms required by many applications, such as vanes and blades. Thus, the present invention now makes available for applications requiring contoured structures, the significant advantages of light weight structurally efficient, thin shell structures with honeycomb cores.

BRIEF SUMMARY OF THE INVENTION

The present invention is particularly suited to producing a very light weight, contoured shell structure having a high degree of structural integrity as it required for blades and vanes in turbofan engines. Thus, this invention will be described with reference to a typical turbofan blade or vane. However, it should be understood that while this description relates to blades and vanes of turbofan engines, it is applicable to substantially all aerodynamic shapes as well as to other applications requiring structurally efficient members. Since the present invention comprises both the method for fabricating and the structure produced thereby, a description of the invented method will necessarily include a disclosure of the invented structure and its essential characteristics. The first step of the present invention is to fabricate a honeycomb panel blank comprising a pair of thin metal face sheets with an inner metallic honeycomb core interposed therein between. Two alternatives are available with respect to the joining of the face sheets to the honeycomb core. One alternative is to resistance weld the panel blank assembly so as to achieve its final design strength. Techniques for resistance welding honeycomb shell structures are well known in the art. A second alternative is to use a two-cycle joining process, i.e., an initial partial diffusion bond followed by a subsequent diffusion bond during or just prior to the final forming operation. During the first cycle of the two-cycle joining process, the face sheets and core of the panel blank are resistance heat joined only to an extent sufficient to hold them together during subsequent operations, but insufficient to enable the panel to sustain the loads for which it is designed. Final design strength is achieved by the second cycle, i.e., the final diffusion bonding step.

The panel blanks may be made in a variety of configurations as required to satisfy the particular design requirements and the operational environment. For example, the panel blank may include internal air flow channels when required to satisfy an anti-icing requirement. For other applications, tubes may be included at intervals within the core materials for additional shear and bending stiffness. In the case of vanes and blades, spaces are provided in the honeycomb core along the outer edges of the panel blades in order to permit installation of leading and trailing edge strips for the fabrication of very low wedge angle edges. Since the present invention is being described with reference to the fabrication of vanes and blades, the latter configuration of the panel blank is the most pertinent to this description.

The panel blank is rough trimmed to size and provisions are made for contour references control by means of index holes. Next, it is crushed in a pair of crush dies in order to achieve the basic shape required. The cellular walls of the honeycomb core crush form to a spring-like shape, while an internal tubes crush form to elliptical shapes. In the case of vanes and blades, the outer edges of the face plates come together on each side of the panel blank to form the beginning of what will ultimately be the leading and trailing edges.

Following the crush forming step, required leading and trailing edge solidity is achieved by inserting metal strips between the contiguous edges of the face sheets of the crushed panel blank. The strips are made of the same metal as the face sheets. Attachment of the strips to the face sheets is preferably by seam diffusion bonding. The leading and trailing edges are then machined to the required wedge angle and radius.

After the leading and trailing edges are machined, the processed part, if orginally made from a finally resistance welded panel blank, is press formed in a matching die set to achieve the required finished contour; heat may be applied when extreme forming is required. On the other hand, when the processed part is made utilizing the two-cycle joining process, the final diffusion bonding cycle of the process necessary to attain design strength, must be performed either before or during the final forming operation. In a combined operation, the processed part is diffusion bonded, and final contour formed all in one operation. The part is placed in a matching die set machined to the exact net shape. The die set is then heated in a vacuum furnace with a suitable weight on top of the die. Use of a vacuum oven substantially prevents oxidation of the processed part. An alternative combined final diffusion bonding and forming operation, also contemplated by the invention, requires the use of a retort die apparatus, which substantially prevents oxidation of the part, while permitting utilization of an atmospheric furnace and atmospheric pressure as the forming force.

When a combined final diffusion bonding and forming cycle is not advantageous, the two operations may be performed sequentially. The processed part is first suspended freely in a vacuum furnace at a temperature which allows the final diffusion bonding process to take place. Following completion of the diffusion bonding, the part is placed into a matching die set and heated to a relatively low temperature, i.e., a temperature which prevents objectionable oxidation while enabling the part to be finally press formed in a normal atmosphere.

In some cases, the angle of twist required by the application may be so great that the processed part will not sufficiently match the contours of the die as is typically required for a matching die final forming operation. In these instances an interim twist operation may be performed prior to the final forming step. For the more ductile materials, (e.g., stainless steel) this first operation can be performed at room temperature; however, for the high strength, low elongation materials (e.g., titanium) creep twisting may be used. Creep twist forming may be performed prior to or during the final diffusion bond cycle of the two-step diffusion bonding and forming sequence. In this mode, when the part is placed in the vacuum furnace, it is secured in an apparatus which holds one end fixed while a static weight is applied about a pivot point at the other end to creep twist the part.

Finally, the length of the part is net trimmed, the indexing holes removed and end fittings or ribs attached by solid state diffusion bonding or fusion bonding such as, for example, electron beam welding.

Thus, a principal object of the present invention is to provide internally stiffened, thin skin shell structures with honeycomb core having the intricate shapes and contours required for such applications as the vanes and blades of power conversion equipment.

Another principal object of the invention is to provide a cost effective method for fabricating contoured and intricately shaped thin skin, shell structures.

Another object of the present invention is to utilize solid state diffusion bonding techniques to achieve parent material properties in the various joints of thin skin shell structures, thereby provided maximum fatigue life for the structure.

The novel features which are characteristic of the present invention, as well as other objects and advantages thereof, will be better understood from the following detailed description, reference being had to the accompanying drawings in which a presently preferred embodiment and method of the invention are illustrated by example.

BRIEF DESCRIPTION OF THE DRAWINGS

FIG. 1b is a functional block diagram showing the basic steps of the invented method as applied to fabricating an aerodynamic vane or blade from a panel blank utilizing a two-cycle diffusion bonding joining process.

FIG. 2a – 2f are perspective views of sections of a number of typical panel blanks, each having a different inner core configuration, said panel blanks being the basic structures from which the invented structures are fabricated.

FIG. 3 is a perspective view of a section of a panel blank having a spacer temporarily interposed within the inner core, the subsequent removal of which leaves desired spaces within the core.

DETAILED DESCRIPTION OF THE INVENTION

Figure 1A:
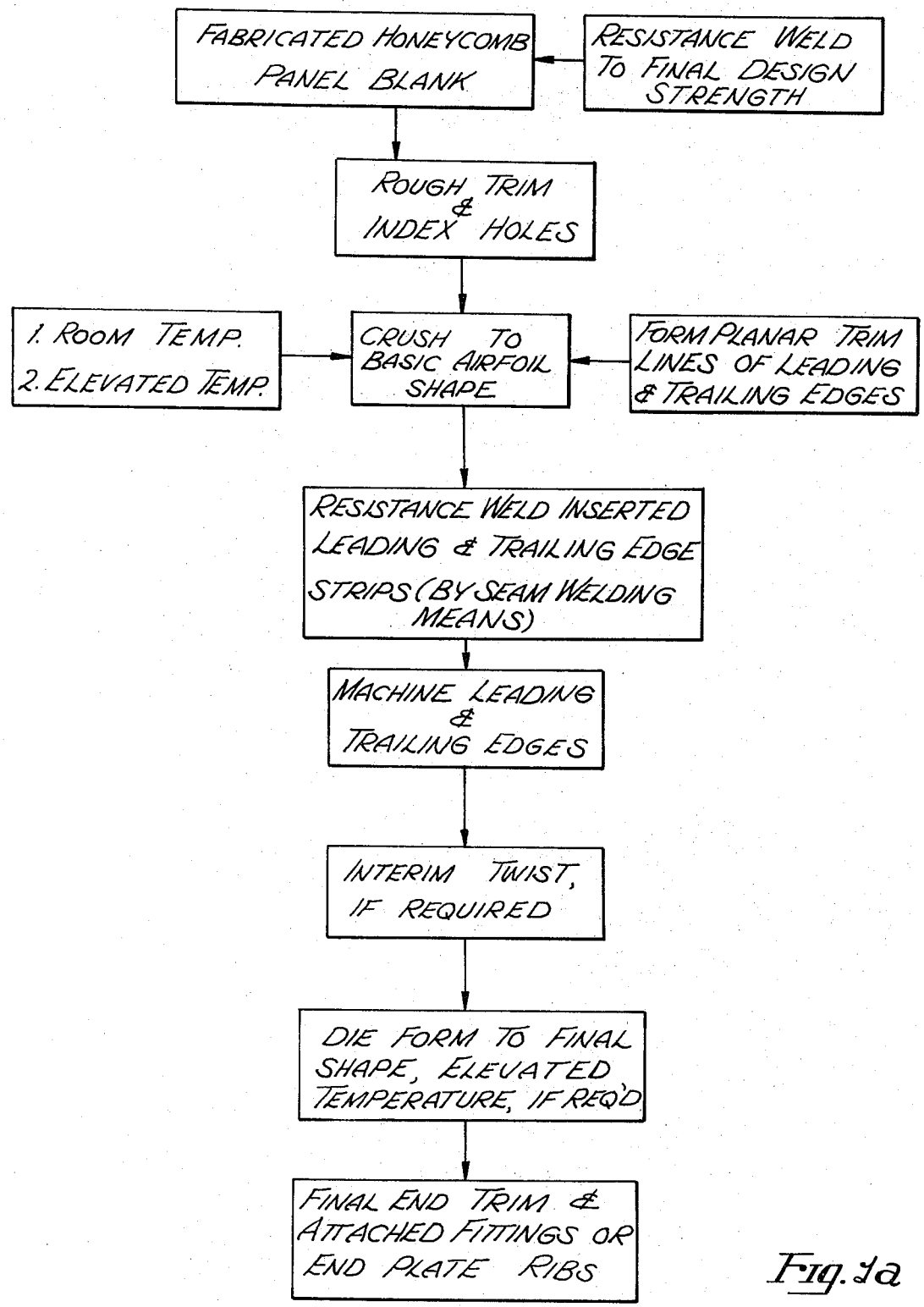
FIG. 1a is a functional block diagram showing the basic steps of the invented method as applied to fabricating an aerodynamic vane or blade from a resistance welded panel blank.
Figure 2B:
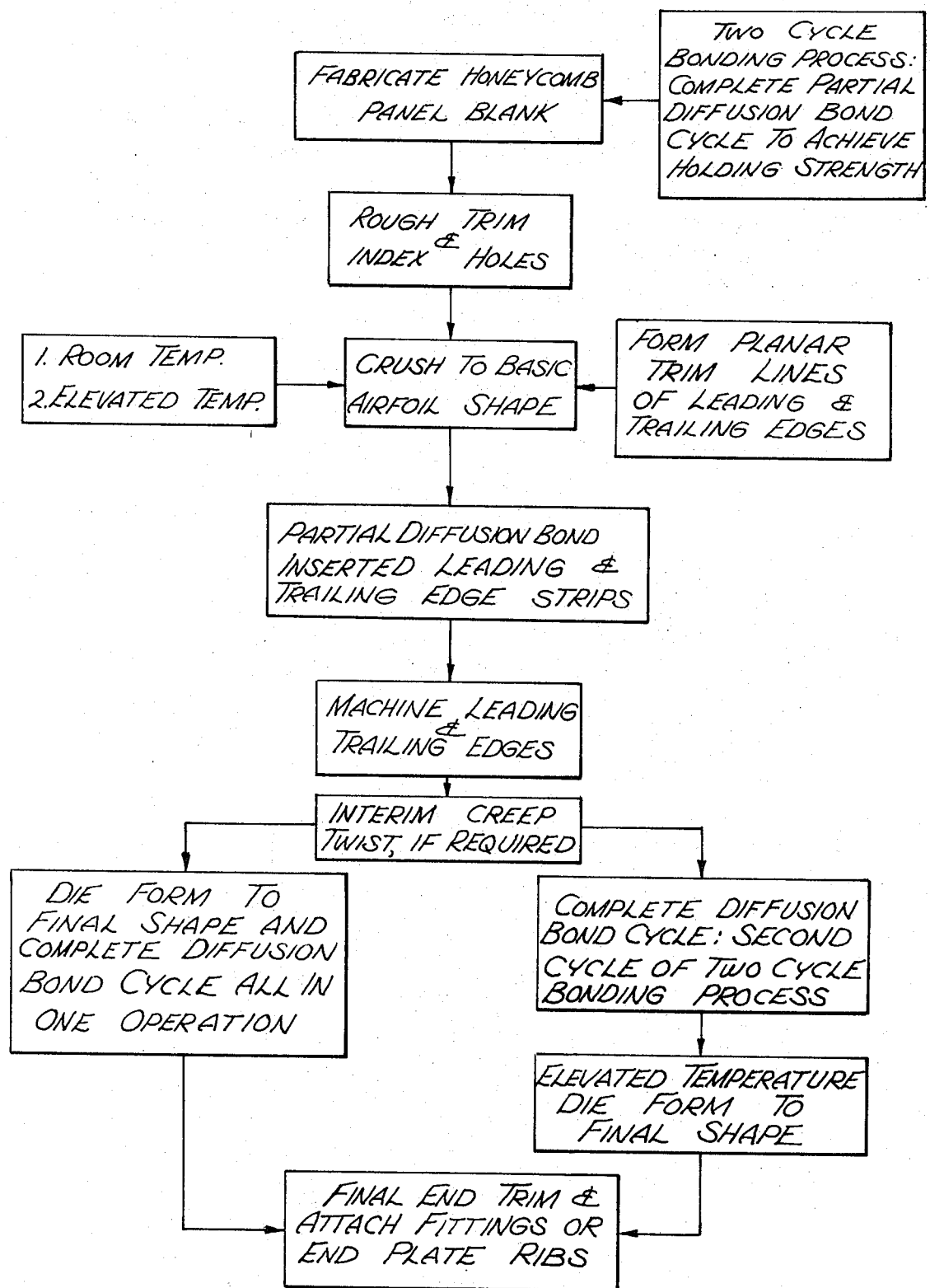

The present invention is now described in detail with respect to the fabrication of a preferred embodiment thereof, namely of an aerodynamic vane or blade. For a better understanding of the following description reference should be had to FIGS. 1a and 1b which functionally depict the flow of the steps comprising two preferred variations of the invented method. In all other FIGURES like numerals are used to designate like elements.

The first step of the invented method is the fabrication of a thin skin honeycomb core panel blank 10 shown in a variety of configurations 10a – 10f in FIGS. 2a – 2f respectively. The panel blank 10 is comprised of a metallic honeycomb core 12 interposed between and joined to a pair of thin face sheets 14 and 15 of like metal. The honeycomb core 12 itself is comprised of a plurality of formed, substantially identical, longitudinal ribbons 16 each having flanged edges 18 for improved joining to the face sheets 14 and 15. The ribbons 16 are typically installed sequentially between the face sheets 14 and 15 in the longitudinal direction of the face sheets 14 and 15 as shown in FIGS. 2a – 2f. Methods for fabricating the panel blank 10 are known in the art; for example, the disclosure of Campbell in U.S. Pat. No. 3,077,532. Metals typically used for fabrication of honeycomb panels by Campbell's method are stainless steel, the basic alloys of titanium, nickel, and cobalt.

The particular configuration of panel blank 10 is a function of the load and dynamic environmental requirements of the application. The configuration shown in FIG. 2a is a typical general purpose panel blank 10 wherein the ribbons 16a, by being indexed over one-half cell pitch, engage one another along nodal lines 20a to form the honeycomb core 12a. Panel blank 10b is the same as blank 10a except that no ribbons 16b are included between the longitudinal edges $E_1$ and $E_2$ of face sheets 14b and 15b in order to enable the subsequent forming of leading and trailing edges in the manner described hereinbelow. The exclusion of ribbons 16 at edges $E_1$ and $E_2$ is described with reference to FIG. 3. Appropriately sized longitudinal spacers, such as spacer 19 in FIG. 3, are included at required intervals along the transverse direction of core 12 during the panel fabrication. These spacers 19 are mechanically removed after ribbon installation is completed, and the panel blanks 10 are then trimmed to their required sizes. During ribbon installation, i.e., during the joining of the ribbons 16 to face sheets 14 and 15, the spacers 19 control the space interval and provide the reaction force necessary to maintain the seating pressure required for installation of the next ribbon 16.

The panel blank 10c shown in FIG. 2c is the same as blank 10b with the inclusion of a longitudinal metal tube 50c within core 12c for additional shear and bending stiffness. The material of tube 50c is typically the same as that of the face sheets 14c and 15c and of core 12c. Tube 50c is installed after a particular number of ribbons 16c are installed, after which ribbon installation is resumed. The tube 50c is joined to face sheets 14c and 15c by electrical resistance welding or seam diffusion bonding achieved by current flow through first and second high resistivity points in the electrical path respectively. First high resistivity points appear continuously along a longitudinal line 22c defined by the tangential engagement of tube 50c with the interior surface of face sheet 14c. Second high resistivity points appear continuously along a corresponding longitudinal line defined by the tangential engagement of tube 50c with the interior surface of face sheet 15c. In order to complete the low resistance electrical path through tube 50c, a low electrical resistance rod such as a copper rod (not shown) is inserted into tube 50c. The electrical power source is connected to face sheets 14c and 15c through a pair of electrodes in the form of wheels (not shown), which electrodes roll over the exterior surface of face sheets 14c and 15c along longitudinal lines 22c in the manner of a seam welder. After the tube 50c is installed as abovedescribed, the low electrical resistance rod is mechanically removed. FIG. 2d shows a panel blank 10d having two tubes 50d and 50d' interposed within core 12d. The number of tubes 50 in any panel blank 10 is a function of the stiffness required.

Panel blank 10e and 10f shown in FIGS. 2e and 2f respectively represent configurations having multiple air (or other fluid) passages S within their respective cores 12e and 12f at specified intervals located along the transverse direction of the cores. Core 12e is fabricated using the spacers 19 shown in FIG. 3 as described hereinabove with reference to achieving ribbon-free edges $E_1$ and $E_2$. Core 12f is a design variation of core 12b. Its ribbons 16f are installed in parallel instead of being indexed over one-half cell pitch, thereby achieving space S. Spacers 19, smaller than that shown in FIG. 3, are required to provide the seating pressure reaction necessary for ribbon installation; i.e., to provide a reaction for seating pressure applied during installation of the next ribbon 16. Internal air flow is required in some applications such as, for example, where an anti-icing capability is required.

Two alternatives are available with respect to the joining of face sheets 14 and 15 to the core 12 and tubes 50, if any, of panel blank 10. The first is to resistance weld to achieve final design strength, using techniques known in the art. The second alternative is to use a two-cycle diffusion bonding process whereby an initial partial diffusion bond is achieved using heat and pressure which provides sufficient strength to maintain the components of the panel blank 10 in an operative relationship until a subsequent final diffusion bonding cycle is completed, the latter achieving the final design strength. The two-cycle diffusion bonding rpocess is particularly advantageous for elevated temperature applications in a high cycle fatigue stress environment wherein the panel blank materials are typically titanium alloys. In such applications it has been found that the weldments formed by resistance welds connecting the face sheets 14 and 15 to the core 12 have a tendency to create so-called stress risers when subjected to the high cycle fatigue loads encountered in these applications. Stress risers constitute areas of changed grain structure where metal has melted and resolidified. Incipient failure of the panel 10 may occur at such stress risers as a result of reduced elongation and increased grain size in the nugget zone of the face sheets 14 and 15 where joined to the core 12. The two-cycle diffusion bonding process eliminates the stress riser characteristics attributable to the resistance welding method of joining the panel blanks 10.

Figure 4:
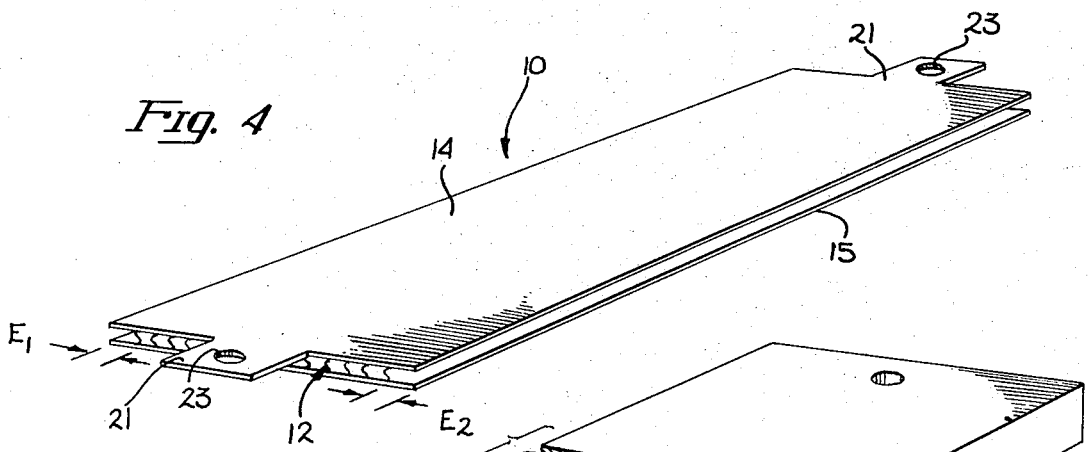
FIG. 4 is a perspective view of a panel blank which has been rough trimmed to size and provided with tabs and index holes for contour reference control.

The first cycle of the diffusion bonding process is achieved by the application of pressure and heat generated by the controlled flow of current through an electrical path defined by face sheets 14 and 15 and core ribbons 16 (and, when tubes 50 are included, by face sheets 14 and 15 and tubes 50 as described hereinabove). As a result panel blank 10 has sufficient strength for subsequent operations. The first panel blank operation is too rough trim the panel blank 10 to size and to provide tabs 21 having index holes 23 for contour reference control, as illustrated in FIG. 4. The tabs 21 are cut down to sufficiently small area so as not to cause any problems during final forming and shaping operations. The panel blank 10 utilized for the embodiment described herein has no ribbons 16 along edges $E_1$ and $E_2$ of face sheets 14 and 15 in order to enable the forming of leading and trailing edges. Ribbon 16 may also be mechanically removed from the transverse ends of panel block 10 by conventional machining techniques to enable manifolding or to satisfy other design requirements.

Figure 5:
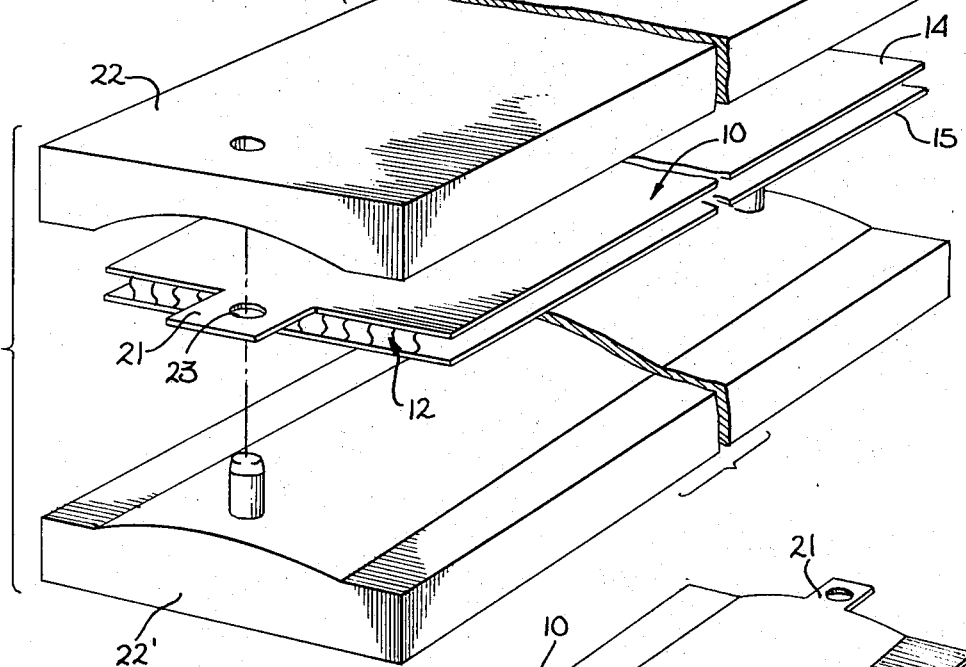
FIG. 5 is a perspective view of a panel blank interposed between matching crush dies prior to crush forming.
Figure 6:
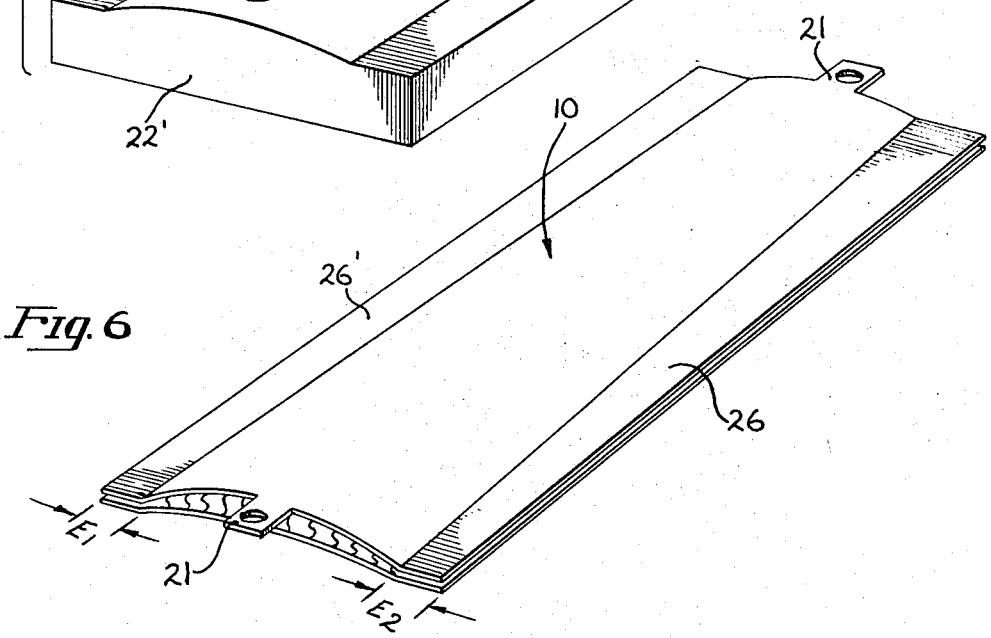
FIG. 6 is a perspective view of the panel blank of FIG. 5 after being crush formed in the crush dies.

Next, the panel blank 10 is between crush dies 22 and 22' as shown in FIG. 5. Crush dies 22 and 22' are fabricated to achieve an underdeveloped vane or blade shape; an underdeveloped shape is one in which the final trim lines of the leading and trailing edges 26 and 26' respectively are planar and thus, the true camber and twist are not achieved. It is not required, however, that the trim lines of the leading and trailing edges be in the same plane. With reference to FIG. 6, it can be seen that the trim line of leading edge 26 is in one plane. Maintaining the trim lines of leading and trailing edges 26 and 26' in their respective planes is important with respect to subsequent resistance welding or partial diffusion bonding and machining operations. Crush dies 22 and 22', having a controlled cavity configuration, are also fabricated so that the camber twist and spanwise contour imparted to the panel 10 are underdeveloped in order to satisfy the planar requirement on the trim lines of edges 26 and 26'. The thickness dimension achieved by crush dies pair 22 and 22' is designed to be slightly oversized so as to ensure positive die fill during a subsequent, final forming operation.

Crushing of the panel blank 10 between crush dies 22 and 22' can take place at either room temperature or an elevated temperature depending upon the properties of the core and materials used. For example, the preferred temperature for crush forming alloys of titanium is about 900°F because of the tendency of such alloys to crack at lower temperatures.

The result of the crushing operation is shown in FIG. 6. It can be seen that the basic or initial aerodynamic shape of the vane or blade has been imparted to the panel blank 10. The cell walls of the honeycomb core 12 and the nodal joints 20 crush form to a spring-like shape while tube 20 is crush formed to an elliptical shape.

Figure 7A:
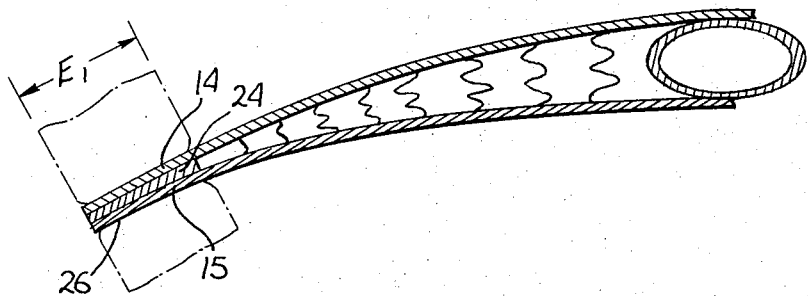
FIG. 7a is a partial cross-sectional view of a processed panel blank having a leading (or trailing) edge insert seam resistance welded or partially diffusion bonded to the face sheets along their edges.
Figure 7B:
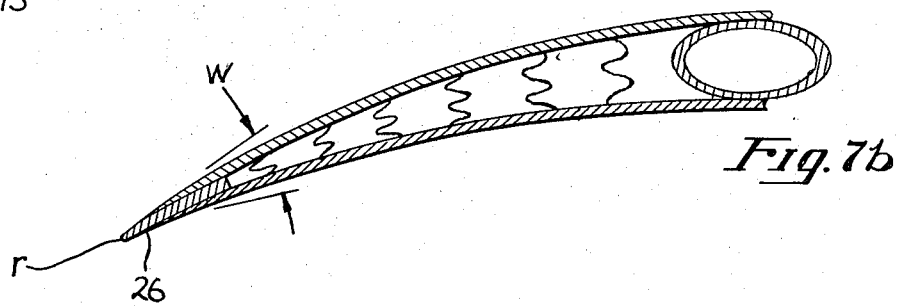
FIG. 7b is a partial cross-sectional view of the leading (or trailing) edge of FIG. 7a after being machined to the required wedge angle and radius.

The next step of the invented method is to form the leading and trailing edges 26 and 26'. In the vane or blade application, leading and trailing edge solidity is of great importance. Solidity allows damage to the edges, caused by foreign objects, to be repaired by filing or machining the edges without getting into the hollow portion of the vane or blade. With reference to FIGS. 7a and 7b the attainment of solidity of leading edge 26 is described. The method described is equally applicable with respect to trailing edge 26'. First a strip of metal 24 is inserted between the face sheets 14 and 15 along edge $E_1$. The metal of strip 24 is the same as that of the face sheets 14 and 15. Face sheets 14 and 15 along their respective edges $E_1$ are contiguous as a result of the previous crush forming operation. The strip 24 is secured to face sheets 14 and 15 by the use of conventional seam welding equipment. In the case of titanium alloys, where the two-cycle diffusion bonding process is utilized, a partial diffusion bond, sufficient to maintain the strips 24 in an operational condition, is achieved by adjusting the seam weld current so that the temperature at the bonding surfaces is below the transformation point of the alloy. Complete diffusion is achieved later in the second cycle of the two-cycle diffusion bonding process described hereinbelow. In the case of steel and nickel base alloys, the current is adjusted to achieve a true resistance weld, if resistance welding is the means selected for securing the strip 24. Next, the leading edge 26 is machined to the required wedge angle W and radius $r$. Typically the wedge angle W and radius $r$ are very small, (i.e., wedge angle is from 6° – 10° while the radius $r$ is about 0.005 inches). The zone of solidity achieved by the invented method is sufficiently wide to encompass the required wedge angle, as shown in FIG. 7b. Machining is typically accomplished by an end mill cutter. The method disclosed herein substantially increases the solidity of leading and trailing edges 26 and 26'. For example, in the case of stator vanes, the leading and trailing edges 26 and 26' have a solidity depth of about 3/16 inch. Solidity depth achievable without the insertion and bonding of strip 24 would typically be in the order of 0.060 inches.

If the processed panel blank (hereinafter referred to as the "part" and designated by the numeral 10') was originally a blank 10 resistance welded to its final design strength, it is now ready for final forming. This is accomplished by placing the part 10' into a die set 28 and 28', shown in FIG. 8, and press forming it either at room temperature or at an elevated temperature as a function of the forming characteristics of the particular alloy used. The die set 28 and 28' is fabricated to provide the required finished contour, allowing for some spring-back. In the die set 28 and 28', therefore, final forming of the part 10' is accomplished, including twisting and the addition of the required camber.

With respect to parts 10' made from panel blanks 10 requiring a two-cycle diffusion bonding process, both final forming and completion of the diffusion bonding remain to be done. As discussed earlier, the two-cycle diffusion bonding process, particularly the final diffusion bonding step, eliminates the introduction of stress risers which are a source of failure in applications placing high cycle fatigue load requirements on the structures. Final forming and diffusion bonding may be accomplished sequentially or in a combined operation.

In a sequential mode, the part 10' is freely suspended in a vacuum furnace maintained at a temperature approximately 100°F below the transformation temperature of the alloy used to fabricate it. After approximately 2 hours at this temperature, the final diffusion bond cycle is typically completed. Oxidation of the part 10' is substantially eliminated at this relatively high temperature by the use of the vacuum furnace. Final forming then takes place while the part 10' is located in the die set 28 and 28', and heated to about 900°F in an atmospheric furnace (or in a heated die) with pressure applied. At about 900°F negligible oxidation of the part 10' occurs. Final forming requires die closure with pressure and heat for a period of approximately 5 to 10 minutes for minimum spring back.

Figure 8:
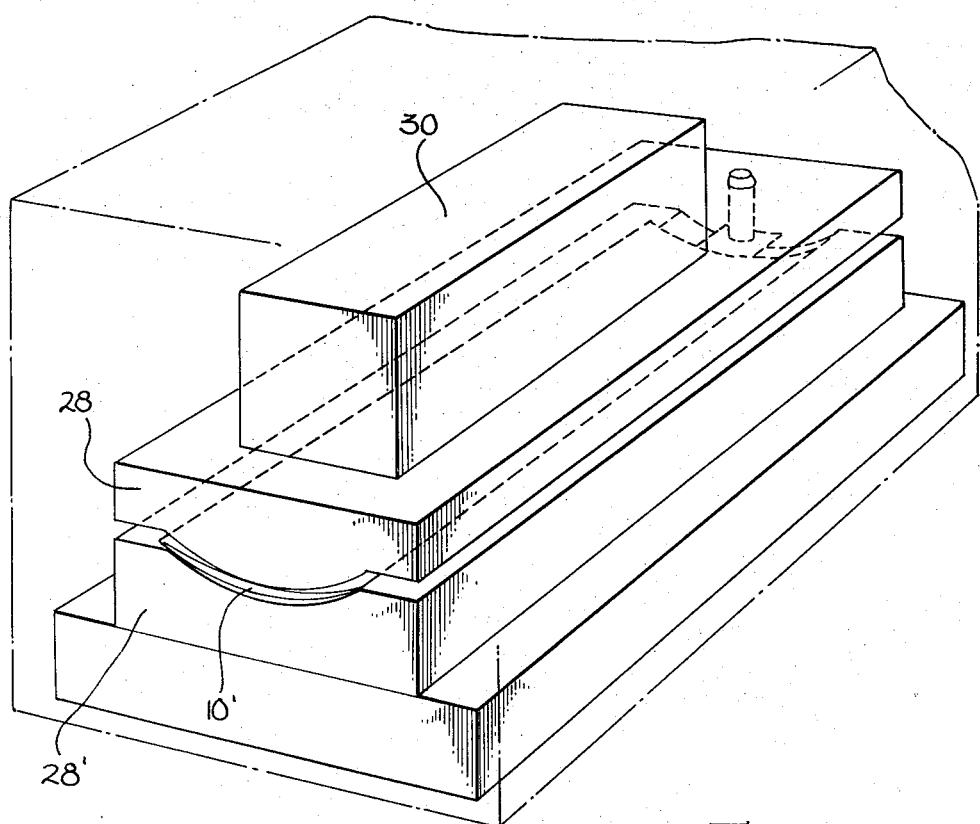
FIG. 8 is a perspective view of a processed panel blank between a set of matching dies during a combined final diffusion bonding and forming operation, said die set having a static weight placed on top thereof.
Figure 9A:
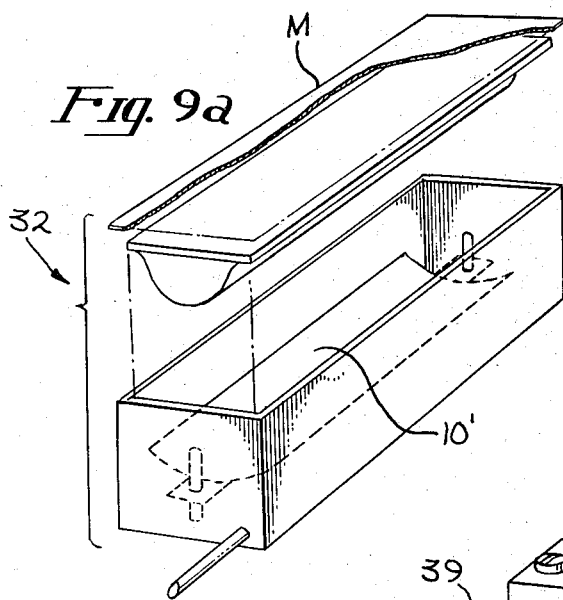
FIG. 9a is a perspective view of a retort die used for performing a combined final diffusion bonding and forming operation.

A combined diffusion bonding and final forming operation is also possible. In this mode, the part 10' is first located in matching die set 28 and 28'. A static weight 30 is placed on top of die 28 to provide an additional pressure of approximately 1.0 p.s.i. on the part 10'. The assembly, as shown in FIG. 8, is then placed into a vacuum furnace and brought to a temperature approximately 100°F below the transformation temperature of the alloy used for part 10'. While at this temperature for about 2 hours, diffusion bonding and final forming occur simultaneously. As in the sequential mode, substantially no oxidation occurs because the part 10' is in a vacuum furnace during the operation. The sequential mode of diffusion bonding and final hot die forming is most economical when a relatively large number of parts 10' are being processed, because the cost of operating the vacuum furnace can be amortized over a large number of such parts. The combined diffusion bonding and final forming mode is suitable when a relatively small number of parts is involved. This is because a large number of parts would incur the additional cost of either (i) recycling in the vacuum furnace many times of (ii) the fabricating a large number of die sets 28 and 28'. For the processing of relatively small number of parts 10' another approach can be used which eliminates the vacuum furnace altogether. This can be accomplished by use of a retort die 32, such as shown in FIG. 9a, instead of die set 28 and 28'. The retort die 32 permits utilization of a minimum size atmospheric furnace.

Figure 9B:
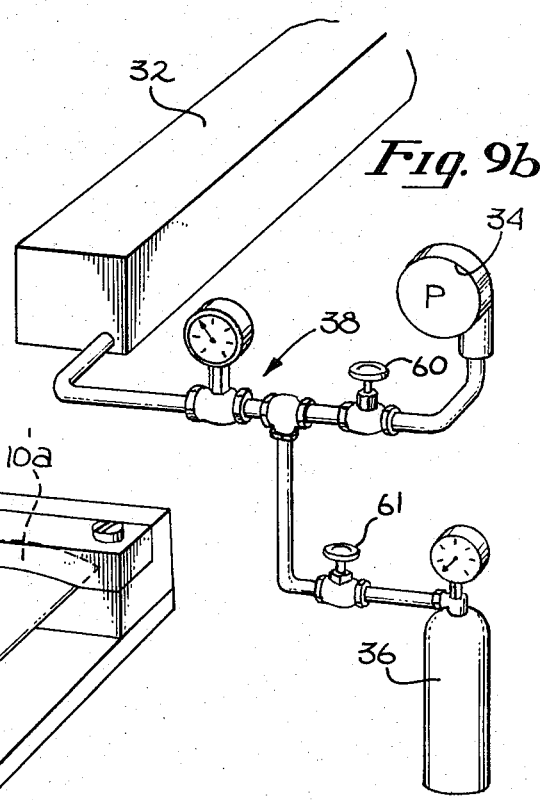
FIG. 9b is a perspective view of the retort die of FIG. 9a connected to a vacuum pump and a source of inert gas, the assembly enabling diffusion bonding in an atmospheric furnace without oxidation of the part being processed and utilizing atmospheric pressure as the final forming force.

With reference to FIG. 9b the use of retort die 32 is explained. After part 10' is located in the retort die 32, the die is sealed by welding a membrane cover M to the lower die body, and the die 32 is placed in an atmospheric furnace. The die 32 is coupled to a vacuum pump 34 and to a source of an inert gas 36, such as argon or helium, through a conventional pipe and valve assembly 38 as shown in FIG. 9b. By their appropriate opening and closing, conventional valves 60 and 61 enable the sequential evacuation of retort die 32 and its back-filling with inert gas. The retort die 32 is evacuated to a minimum vacuum level of about $10^{-4}$ TORR and then back-filled with the inert gas. The evacuation and back-filling cycle is repeated at least three times, and then a final vacuum is achieved and maintained. By virtue of the multiple evacuation and back-filling cycles, any residual gas in the retort die 32 is substantially the inert gas rather than air. The retort die 32, with the vacuum pump operating, is then placed in the furnace. For alloys of titanium the temperature of the furnace is raised to approximately 1,000°F and held for approximately 30 minutes to allow additional outgassing of any remaining contaminants. The temperature is then raised to about 1,650°F and held there for about 2 hours during which time the diffusion bonding cycle is completed. The forming force is achieved by atmospheric pressure on the membrane cover M. Die 32 and part 10' are then air cooled and the retort die 32 opened by cutting the membrane cover M. It should be understood that use of the retort die 32 also enables the carrying out of a combined diffusion bonding and final forming operation, as described earlier.

In some applications, the angle of twist required may be so great that the part 10' will not sufficiently match the contours of the die as required in the abovedescribed forming operation. In addition, if the twist is too great, the core material 12 may be damaged during the forming process. In such cases an interim twist forming operation must be performed prior to placing the part 10' into the die for final forming. For the more ductile material (e.g. stainless steel) this interim twist operation can be done at room temperature; however, for the high strength, low elongation materials (e.g., titanium) creep twisting may be used.

Figure 10:
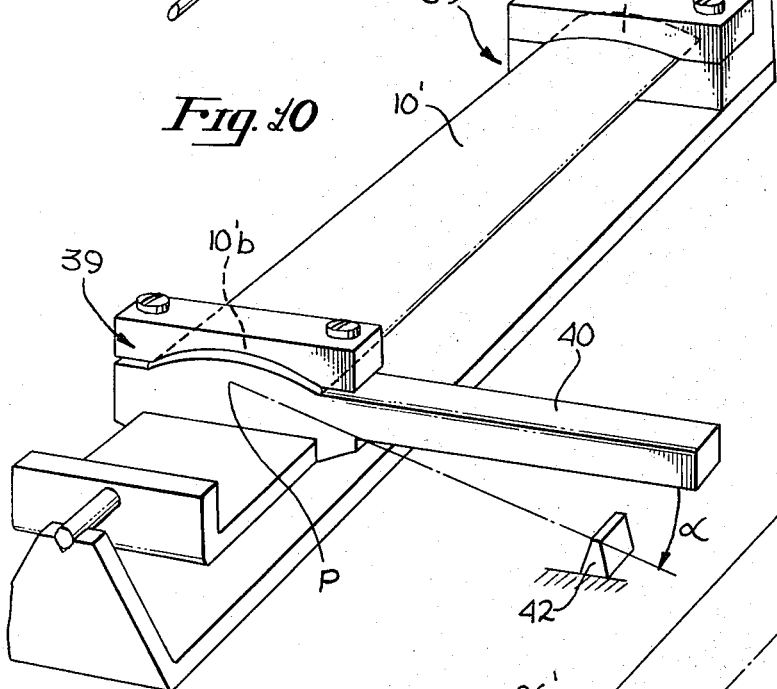
FIG. 10 is a perspective view of the processed part in an apparatus designed to provide interim creep twist forming.

Creep twist forming is accomplished by placing the part 10' into an apparatus 39 as shown in FIG. 10. Apparatus 39 is configured to hold the part 10' fixed at one end 10a', while a static weight 40 is applied about a pivot point P at end 10b' of part 10'. Apparatus 39 is then placed in a vacuum or inert atmosphere and heated to a temperature within the known creep range temperature of the metal or alloy utilized for the part 10'. In the case of alloys of titanium, a temperature of about 1,300°F to 1,650°F is preferred for the interim creep twist forming operation (if required) because of the high creep tendency of titanium alloys. By virtue of the weight 40, gradual creep twist forming takes place as required. Stop 42 determines the twist angle $\alpha$. The use of a vacuum or inert atmosphere during creep twist forming minimizes the oxidation of the part 10'. In general, creep twist forming is most advantageously done after the edges 26 and 26' have sufficient strength to bear the bending forces, thereby reducing distortion of the core 12.

When the sequential two step mode of final diffusion bonding and final forming is being followed, the interim creep twist forming operation may be performed during the final diffusion bonding cycle; since the part 10' is not in die set 28 and 28' during the final diffusion bonding cycle, apparatus 39 can be utilized while the part 10' is in the vacuum furnace.

As indicated above, in the case of ductile materials, the interim twist operation may be performed at room temperature. Twist forming at room temperature is accomplished in an apparatus similar to that of apparatus 39, except that instead of static weight 40, an external force is applied, such as for example, an hydraulic strut.

Finally, the part 10' is net trimmed to the desired length. The tabs 21 are removed and end fittings or ribs are attached. The end attachments can be made by fusion welding or solid state diffusion bonding techniques.

Figure 11:
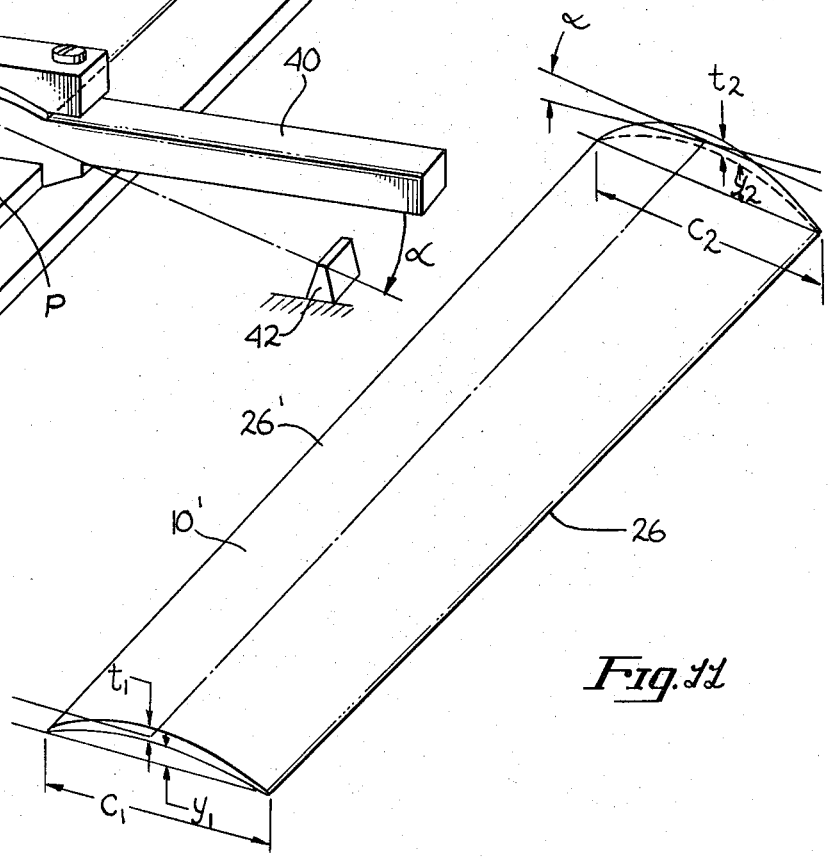
FIG. 11 is a preferred embodiment of this invention fabricated by the method, i.e., a typical aerodynamic vane or blade.

FIG. 11 depicts the finished part 10', i.e., a typical vane or blade used in power conversion equipment. Its cross-section is a thin airfoil shape having a variable angle of twist $\alpha$, a thickness varying from $t_1$ to $t_2$, chord varying from $C_1$ to $C_2$ and camber varying from $Y_1$ to $Y_2$. The leading and trailing edges 26 and 26' have very small wedge angles, i.e., angles which approach a knife edge typical in aerodynamic applications. The result is a stabilized thin skin shell structure having a high strength to weight ratio as required for maximum efficiency.

Although this invention has been disclosed and described with reference to a particular embodiment and to a preferred method, the principles involved are susceptible of other applications which will be apparent to persons skilled in the art. Also, it should be understood that while specific reference has been made to alloys of titanium as the preferred material, other wrought alloys can be used. It is understood that various changes in the form, detail and application of the present invention can be made by those skilled in the art without departing from the spirit and scope of the invention. This invention, therefore, is not intended to be limited to the particular embodiment or preferred method herein disclosed.

I claim:

1. A method for fabricating thin skin, internally stiffened, contoured shell structures comprising the steps of:
    a. fabricating a panel blank comprised of a metallic cellular core disposed between and joined to first and second planar metallic face sheets, said face sheets each having a thickness dimension substantially less than its surface dimensions, said cellular core being partially diffusion bonded to said face sheets only to acheive sufficient strength to maintain said panel blank in an operative relationship, but less than final design strength;
    b. forming said panel blank into a basic shape and imparting thereto basic contours in an initial forming operation;
    c. forming edges along the periphery of said panel blank;
    d. finally diffusion bonding said cellular core to said face sheets to achieve final design strength; and
    e. forming said panel blank into its final shape and imparting thereto its final contours in a final forming operation.

2. The method of claim 1 wherein said final diffusion bonding step is accomplished by heating said panel blank in a vacuum furnace to a temperature approximately 100°F below the transformation temperature of the metal used to make said core and said face sheets for a duration which allows completion of said diffusion bonding step.

3. The method of claim 1 wherein said final diffusion bonding step is performed immediately prior to said final forming operation.

4. The method of claim 1 wherein said final diffusion bonding step is performed concurrently with said final forming operation.

5. The method of claim 4 wherein said concurrent diffusion bonding step and said final forming operation are performed in an atmospheric furnace by a method comprising the steps of:
    a. placing said panel blank into a retort die;
    b. evacuating said retort die to a vacuum of approximately $10^{-4}$ TORR with a vacuum pump;
    c. filling said retort die with an inert gas;
    d. repeating steps (b) and (c) at least three times;
    e. raising the temperature of said retort die, with said vacuum pump operating, to approximately 1,000°F and maintaining it there for about 30 minutes;
    f. evacuating said retort die to a vacuum of approximately $10^{-4}$ TORR and sealing said retort die;
    g. raising said temperature to approximately 100°F below the transformation temperature of said metal and maintaining it for a duration which allows completion of said final diffusion bonding step and final forming by atmospheric pressure force.

6. The method of claim 5 wherein said metal of said panel blank is an alloy of titanium and said temperature and duration in said step (g) of claim 5 are about 1,650°F and 2 hours respectively.

7. The method of claim 4 wherein said concurrent diffusion bonding step and said final forming operations are performed in a vacuum furnace by a method comprised of the steps of:
    a. placing said panel blank into a die set;
    b. placing a static weight on top of said die set;
    c. placing said die set and said weight into said vacuum furnace and evacuating the same;
    d. raising the temperature in said vacuum furnace to a temperature approximately 100°F below the transformation temperature of said metal and maintaining it there for a duration which allows completion of said final diffusion bonding step and final forming by the pressure of said weight.

8. The method of claim 1 wherein said initial forming operation is accomplished by crush forming within a crush die set.

9. The method of claim 1 wherein said edges are formed along the periphery of said panel blank by a method comprising the steps of:
    a. during said initial forming operation, causing corresponding first and second longitudinal edges of each of said face sheets to come into substantial contact to form leading and trailing edges respectively, said leading and trailing edges each having planar trim lines;

b. inserting first and second metallic strips between said corresponding first and second longitudinal edges of said face sheets;

c. joining said first and second strips to said corresponding first and second longitudinal edges of said face sheets, whereby said leading and trailing edges are each provided with substantial solidity; and d. machining said leading and trailing edges to achieve a desired wedge angle and radius.

10. The method of claim 9 wherein said metallic strips are partially diffusion bonded to said longitudinal edges only to achieve sufficient strength to maintain said leading and trailing edges in an operative relationship, but less than full design strength, said final diffusion bonding step achieving full design strength, whereby stress risers are eliminated.

11. The method of claim 1 wherein said final forming operation is accomplished in a die set.

12. The method of claim 1 wherein said panel blank is fabricated with at least one longitudinally disposed metal tube interposed within said core at at least one location along the transverse direction of said panel blank and joined to said first and second face sheets along first and second longitudinal lines defined by the tangential engagement of said tube with the interior surfaces of said first and second face sheets respectively.

13. The method of claim 12 wherein the joining of said tube is accomplished by a method comprising the steps of:

a. inserting a low resistivity rod into said tube for at least the length of said tube;

b. causing electrical current to flow through first high resistivity points located continuously along said first longitudinal line;

c. causing electrical current to flow through said low resistivity rod;

d. causing electrical current to flow through second high resistivity points located continuously along said second longitudinal line; and e. removing said rod.

14. The method of claim 13 wherein said electrical current is adjusted to a level suited to cause said tube to be partially diffusion bonded to said face sheets, said final diffusion bonding step achieving full strength characteristics.

15. The method of claim 1 wherein said core is fabricated by sequentially installing a plurality of longitudinal formed metallic ribbons between said face sheets and joining said ribbons thereto, said ribbons being installed in spaced relation in the longitudinal direction of said face sheets.

16. The method of claim 15 including the additional step of temporarily placing spacers at predetermined intervals during said installation of said ribbons and removing said spacers after said ribbon installation is completed, whereby passages for fluid are provided within said core.

17. The method of claim 15 wherein said ribbons are installed by indexing them over one-half cell pitch so as to form a plurality of honeycomb cells, said ribbons engaging one another along a plurality of nodal lines.

18. The method of claim 1 including the additional step of forming an initial twist angle in said panel blank by aan interim twisting operation performed subsequent to forming said edges and prior to said final forming operation.

19. The method of claim 18 wherein said twisting operation is accomplished in an inert atmosphere by holding the fore end of said panel blank fixed while allowing the aft end of said panel blank to rotate about a pivot point until a stop is reached, rotation of said aft end being caused by a static weight coupled thereto, said panel blank being maintained at an elevated temperature in the creep range of the metal utilized.

20. The method of claim 19 wherein said metal of said panel blank is an alloy of titanium and said temperature is approximately 1,300°F – 1,650°F.

21. The method of claim 18 wherein said metal of said panel blank is a highly ductile material and said twisting operation is accomplished at room temperature by holding the fore end of said panel blank fixed while allowing the aft end of said panel blank to rotate about a pivot point until a stop is reached, rotation of said aft end being caused by an externally applied force.

22. The method of claim 1 including the additional step of trimming said panel blank to its final size and attaching end plates to the fore and aft ends thereof.

23. A method for fabricating thin skin, internally stiffened, contoured shell structures comprising the steps of:

a. fabricating a panel blank comprised of thin first and second titanium alloy face sheets and a plurality of longitudinal titanium alloy ribbons disposed thereinbetween in adjacent spaced relation in the longitudinal direction of said face sheets, except for a specified transverse distance along first and second longitudinal edges of said face sheets, said ribbons being partially diffusion bonded to said face sheets only to achieve sufficient strength to maintain said panel blank in an operative relationship, but less than final design strength;

b. providing means for contour reference control;

c. forming said panel blank into an initial shape and imparting thereto basic contours by means of a crush die set, whereby said corresponding first and second longitudinal edges of each of said face sheets are brought into substantial contact to form leading and trailing edges respectively, said leading and trailing edges each having planar trim lines;

d. inserting first and second metallic strips between said corresponding first and second longitudinal edges of said face sheets;

e. partially diffusion bonding said first and second metallic strips to said corresponding first and second longitudinal edges of said face sheets only to achieve sufficient strength to maintain said leading and trailing edges in an operative relationship, but less than full design strength, whereby said leading and trailing edges are each provided with substantial solidity;

f. machining said leading and trailing edges to achieve a desired wedge angle and radius;

g. forming an initial twist angle in said panel blank by an interim twisting operation in an inert atmosphere by holding the fore end of said panel blank fixed while allowing the aft end of said panel blank to rotate about a pivot point until a stop is reached, rotation of said aft end being caused by a static weight coupled thereto, said panel blank being maintained at a temperature of approximately 1,300°F – 1,650°F;

h. finally diffusion bonding said ribbons to said face sheets and said strips to said longitudinal edges by heating said panel in a vacuum furnace to approximately 1,650°F for approximately 2 hours, thereby achieving final design strength;

i. forming said panel blank into its final shape and imparting thereto its final contours in a final forming operation accomplished in a retort die, said final forming operation being performed concurrently with said final diffusion bonding; and j. trimming said panel blank to its final size and attaching end plates to the fore and aft ends thereof.

* * * * *